(No Model.) 3 Sheets—Sheet 1.
P. O. ANDREASEN.
BUTTER MOLDING AND CUTTING MACHINE.
No. 491,792. Patented Feb. 14, 1893.
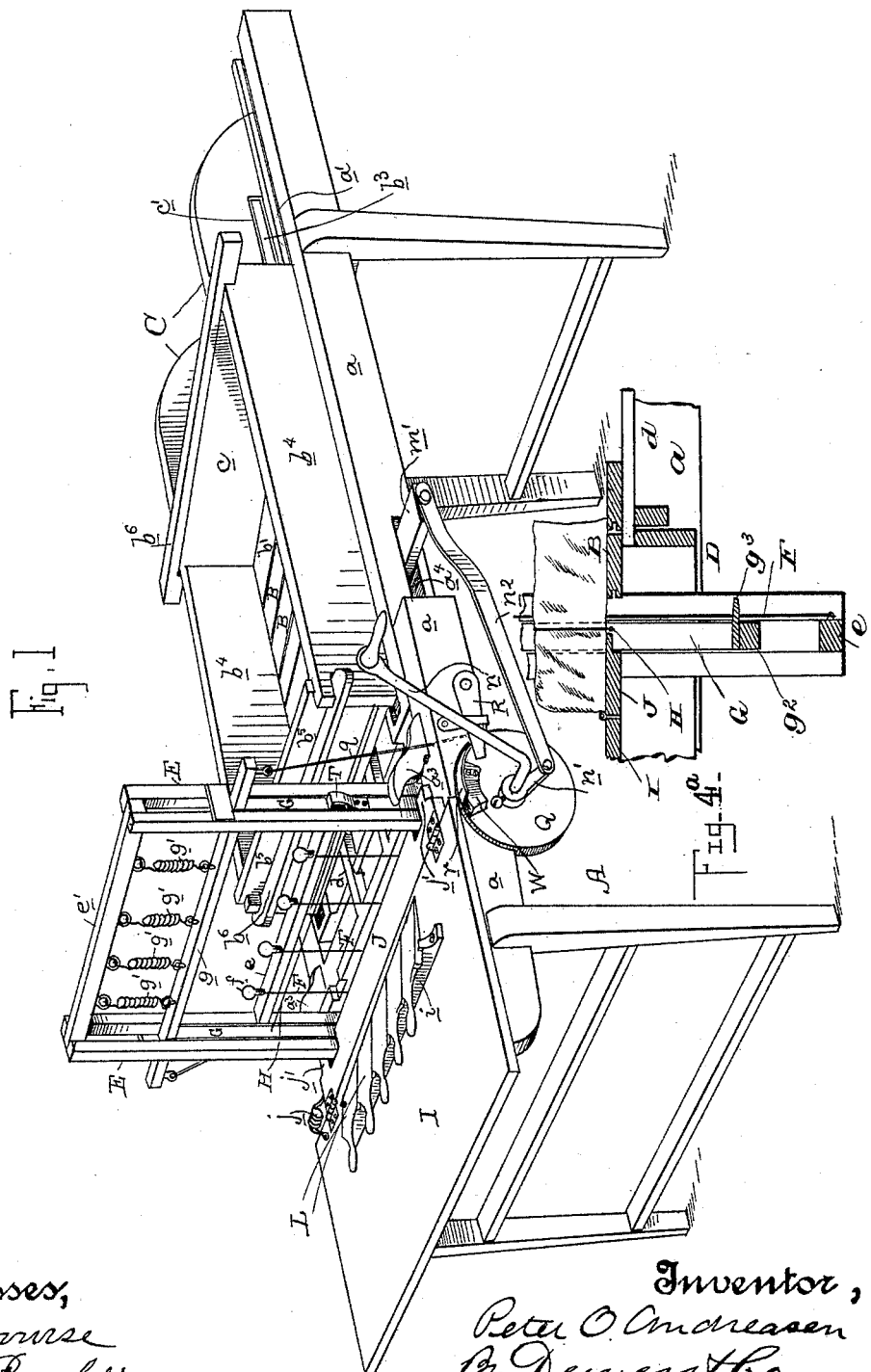

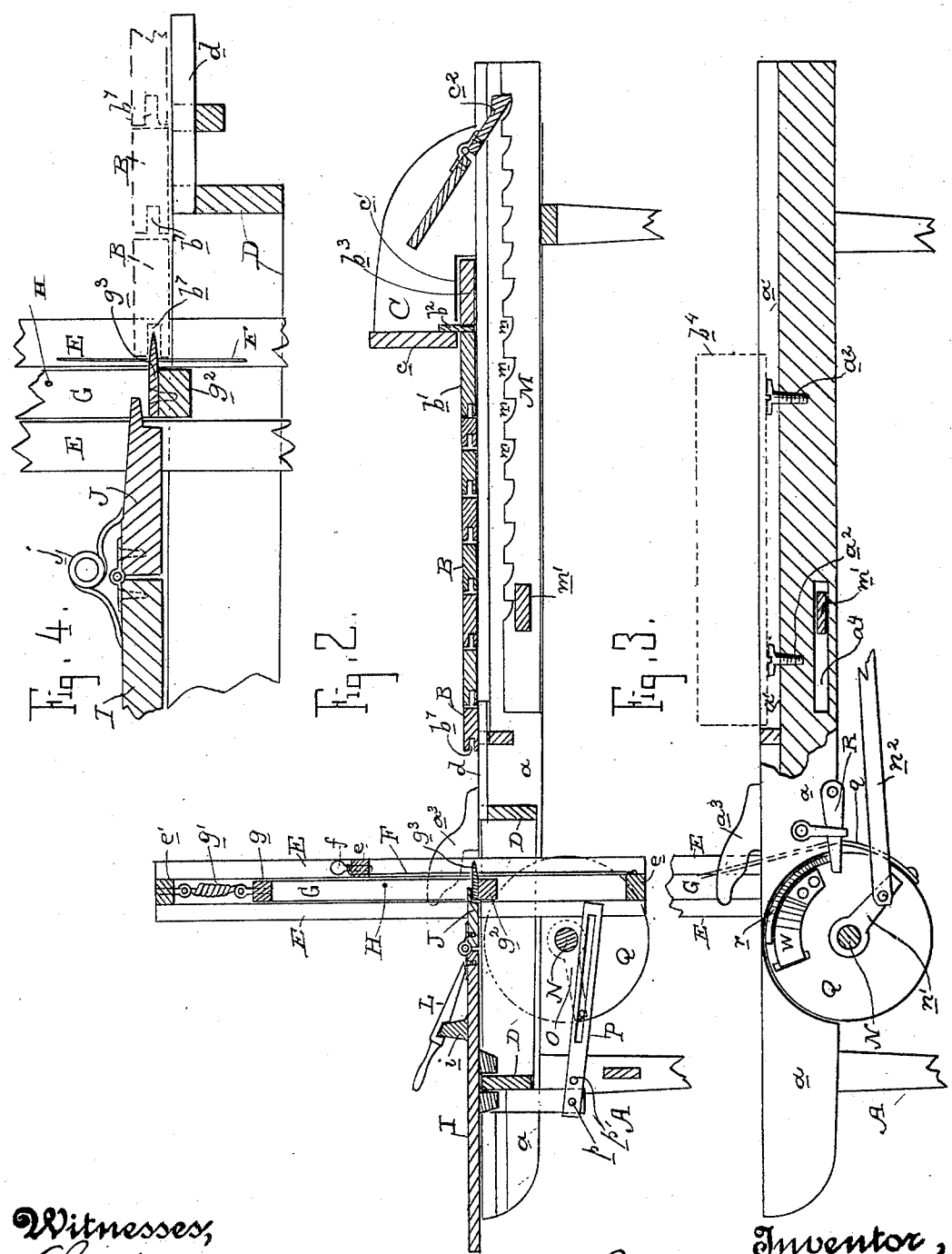

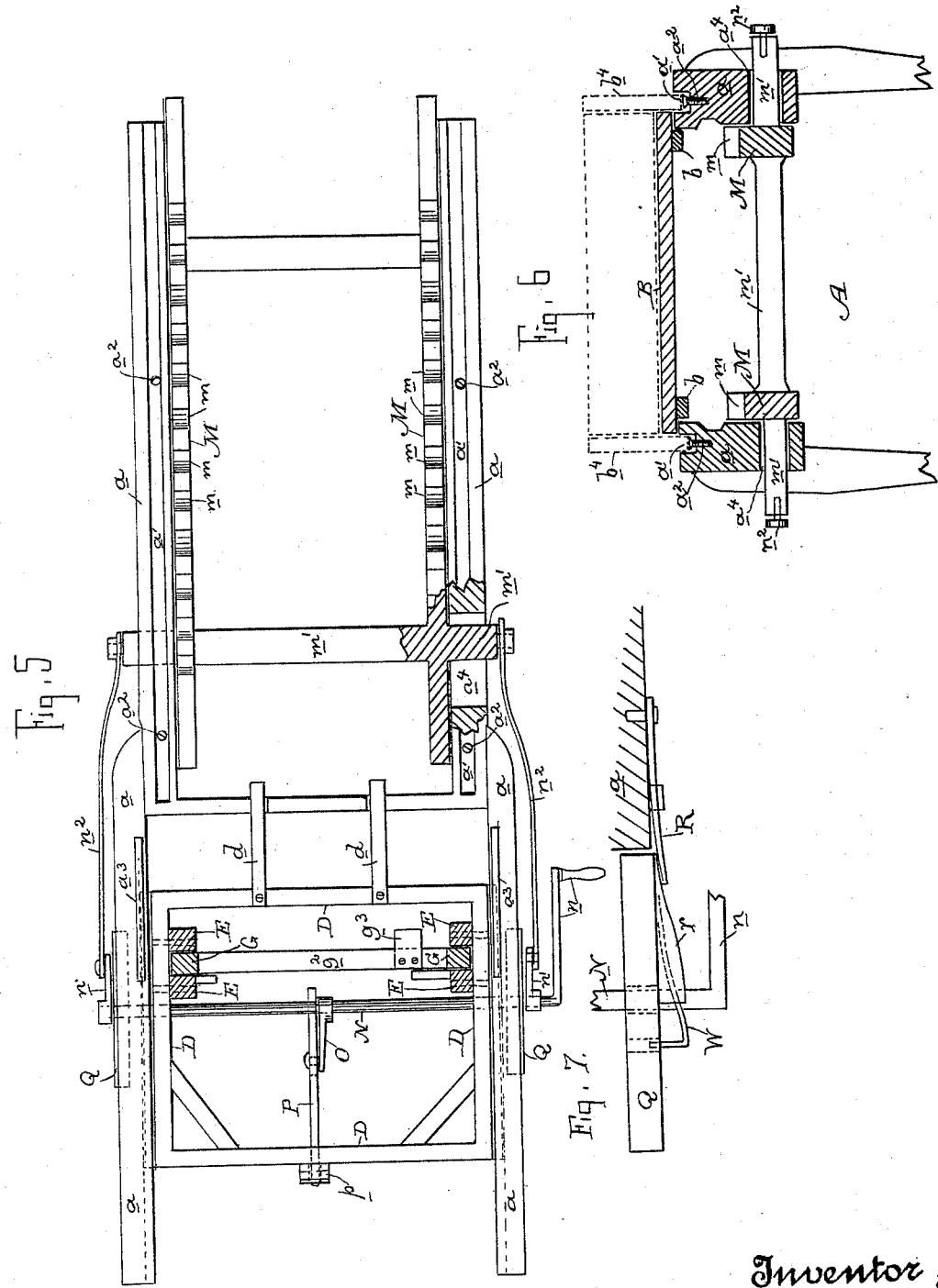

UNITED STATES PATENT OFFICE.

PETER OLUF ANDREASEN, OF FERNDALE, CALIFORNIA.

BUTTER MOLDING AND CUTTING MACHINE.

SPECIFICATION forming part of Letters Patent No. 491,792, dated February 14, 1893.

Application filed October 10, 1892. Serial No. 448,428. (No model.)

*To all whom it may concern:*

Be it known that I, PETER OLUF ANDREASEN, a citizen of the United States, residing at Ferndale, Humboldt county, State of California, have invented an Improvement in Butter Molding and Cutting Machines; and I hereby declare the following to be a full, clear, and exact description of the same.

My invention relates to butter manipulating machinery having for its object the molding and the cutting of the butter into squares.

My invention consists in the novel sectional bed for the butter, the means for periodically advancing said bed and feeding the butter to the cutters, the means for relieving the advanced end of the butter from the underlying bed, and cutting said end both lengthwise and crosswise into squares, the means for operating the cutters, the means for separating and discharging said squares, all of which together with various details of arrangement, construction and combination I shall hereinafter fully describe and specifically point out in the claims.

The object of my invention is to provide a machine adapted to mold and cut butter effectively, rapidly and with precision.

Referring to the accompanying drawings, Figure 1 is a perspective view of my machine. Fig. 2 is a vertical longitudinal section of same, the sides and end of the mold being removed. Fig. 3 is a side elevation, a portion of the side rail $a$ being in section. Fig. 4 is a sectional view, showing the engagement of the lug $g^3$ with the detachable bottom boards B. Fig. 4$^a$ is a similar view showing the carriage in its advanced position. Fig. 5 is a sectional plan, the bottom boards, the pusher frame and the receiving platform being removed. Fig. 6 is a cross section in the plane of the cross bar $m'$. Fig. 7 is a plan of the catching and tripping mechanism of drum Q.

A is a stand having the side rails $a$. These rails at the outer end of the stand are closer together than at the inner end. Upon and between these rails rest the boards B forming the bottom of the butter mold. These boards are in separate pieces or slats adjacent to each other and fitted and adapted to slide upon the rails $a$ in any suitable manner, as by means of grooves, or, as here shown, by cleats $b$ on their under surfaces, bearing against the side rails. Also mounted upon the side rails $a$ and adapted to slide thereon, is a pusher frame C, the front board $c$ of which forms the outer end wall of the mold. This pusher frame is cut out at its front and sides, as shown at $c'$, in order to receive under it the last bottom board $b'$ of the mold, and said board has cleats $b^2$ projecting upwardly behind the front board of the pusher frame, whereby the board and frame are connected while moving outwardly. In the cut outside portion $c'$ of the pusher frame is fitted the supplemental cross board $b^3$ which bears against the last board $b'$ of the mold bottom, so that when the pusher frame is forced inwardly it will push all the boards B of the bottom before it.

The mold is completed by the addition of vertical side pieces $b^4$, which rest in grooves $a'$ in the side rails $a$, and an end piece $b^5$, said pieces being held together by clamps $b^6$, which being removable, permit the removal of the side and end pieces, when the cake of butter to be formed in the mold is ready to be cut. In the grooves $a'$ are vertical supports $a^2$, preferably in the form of large headed screws. Upon the supports the side pieces of the mold rest, and by their adjustment up or down, the depth of the mold, and the consequent thickness of the butter cakes, are regulated. Fitted between the side rails $a$ at the other or larger end of the stand is a sliding carriage D, from the front board of which extend forwardly arms $d$, which pass under the boards B of the mold bottom. Near the inner end of the sliding carriage D are vertical standards E, between the lower portions of which are the vertical cutting wires or strings F, carried by cross bars $e$ of the standards and tightened by means of keys $f$. These cutting wires are separated from each other by spaces equal to the width of the squares of butter to be cut, and they are in any suitable number according to the capacity of the machine. Between these cutters and the front bar of the carriage is an open space. In the standards E is mounted and adapted to slide up and down, a frame G which carries, at about its middle, a horizontal cutting wire H. This frame has a top bar $g$ to which springs $g'$ are attached, the other ends of said springs being connected with the top cross bar $e'$ of the vertical standards and said springs exert their power to hold the sliding frame G up. Secured to the lower cross-bar $g^2$ of the vertical frame G is a projecting lug $g^3$ which is adapted to receive the grooved edge $b^7$ of the bottom boards B of the butter mold, as will be hereinafter explained.

I is a receiving board, having at its inner end the hinged, upwardly swinging apron J, controlled and held down by a spring $j$. This board rests lightly upon the side rails and is grooved into the sliding carriage whereby it and its apron move with said carriage. The ends of the apron are notched over the standards E, and the extremities $j'$ of said apron play under curved fixed stops $a^3$ on the side rails of the frame. Upon a cross cleat $i$ on the receiving board I rest the hand-paddles L just back of the apron J.

The operation of the machine as far as described is as follows: All the boards B forming the bottom or bed of the mold are laid in place upon the side rails of the stand. The side and end pieces $b^4$ and $b^5$ are then put in place and clamped, whereby the mold is completed, and consists of the bottom boards B, the side and end pieces and the front board $c$ of the pusher frame C. The butter is now supplied to this mold and is properly packed and leveled off therein. Then the side and end pieces of the mold are removed, thus exposing the large molded cake of butter upon both sides and upon its forward end, its rear end resting against the front board $c$ of the pusher frame and the whole cake being supported upon the bottom boards B. The pusher frame is now moved inwardly toward the middle of the machine, which has the effect of pushing before it all the boards B, and the cake of butter upon them. At the same time the carriage D is moved toward the middle of the machine, thus approaching the butter. The forwardly projecting arms $d$ of the carriage pass under the foremost bottom board B as said board is moved forwardly upon them, whereby this board though now free of the side rails upon which it previously rested, is supported during its movement by said arms. Upon this first movement the advanced edge of the butter is not brought up to the vertical cutters, but is in close proximity thereto. The advanced bottom board B has, by this movement, been forced inwardly far enough to be entirely back of the front board of the carriage, and lies directly over the open space in front of the cutters. Its grooved edge $b^7$, however, has received the projecting lug $g^3$ upon the vertical moving frame G. This lug and the adhesion of the butter are now the only means of supporting this advanced board B. Now the frame G is caused to descend, whereby the lug $g^3$ pulls downwardly, and detaches the advanced board B from the butter, and forces it to drop down on the floor, thus leaving the projecting forward edge of the butter exposed and unsupported, ready to be cut on the next full movement. When the frame G has returned to its upper limit, the movements are repeated, and then the projecting, and exposed end of advancing butter meets with the advancing cutting wires F of the standards E which are secured to the carriage and are thereby cut longitudinally into the cake, and said cut portion finally rests upon the apron J. The downward movement of the frame G now has the effect, first of positively throwing down, by means of its lug $g^3$ the now foremost bottom board of the mold, and second of cutting through the butter crosswise by means of the wire H; so that there now lie upon the apron the several cut or severed squares of butter. As the frame G rises, it engages, by means of connections, to be presently described, with the extremities of the apron J thereby tending to swing or tilt the apron backwardly. At the same time the carriage D is moving back, carrying with it the receiving board and apron, so that the extremities of the latter are gradually withdrawn from under the curved fixed stops $a^3$, whereby the backward swinging of the apron is gradually effected by the frame G moving upwardly under the influence of its springs, and the movement is checked sufficiently to prevent the apron from being thrown up too violently. By this backward movement of the apron the several squares of butter are deposited upon the hand paddles L, and may then be removed. The means for effecting these movements, I shall now describe.

Upon the inner sides of the rails $a$ at the outer end of the stand are mounted the slide bars M having ratchet teeth $m$ upon the upper surfaces, these sliding bars are connected by cross-bar $m'$, the ends of which project through and play in elongated slots $a^4$ in the side rails. The outer end of the pusher frame C is provided with a swinging gravity pawl $c^2$ which is adapted to fall down into engagement with the ratchet teeth of the slide-bars. Mounted transversely under the machine is a shaft N, to which any suitable power may be applied, here shown as a crank handle $n$ on one end. The operating mechanism from this shaft being alike on both sides, it will be necessary to describe only that upon one side. The shaft has upon it a crank $n'$ from which a connecting link $n^2$ extends to the projecting ends of the cross-bar $m'$ of the slide-bars M. Now by turning the crank handle backward, the slide-bars M will be drawn inwardly, and these bars engaging, through their ratchet teeth, with the pawl of the pusher frame, will move said frame inwardly and will thus feed and advance the bottom boards B and the butter as heretofore described. The return movement of the crank will move the ratchet bars outwardly again, and in this movement their teeth slip the pawl of the pusher frame, thus leaving said frame in the position to which it had been moved upon the previous stroke. Thus the pusher frame and the bottom boards and the butter are advanced periodically and steadily. The shaft N has at its middle a downwardly extending crank arm O which is connected by the link P with the rear end of the carriage D. The connection between the crank and link is a slotted one as shown, whereby the power of the crank is transmitted to move the carriage only at the times desired and through the specified movement. This movement is further regulated by an adjustable connection between the link and the rear end of the carriage, said connection consisting of a removable bolt $p$ adapted to enter any of several holes $p'$ in the link. It will now be seen that by the backward movement of the crank handle, the carriage D will be moved inwardly to carry its cutters to the advancing butter and by the forward movement of said crank handle, the carriage with its attached parts will be withdrawn, as heretofore described.

Loosely mounted upon the shaft N is a drum Q, one on each side of the machine. Secured to this drum is a wire, cord or cable $q$ the upper end of which is secured to the top bar of the sliding frame G. Upon the outer face of the drum is a spring catch W, over the face of which the crank arm $n'$ plays, and is adapted to come into engagement with the end thereof. Secured to the side rail $a$ is a spring trip arm R, adapted to be forced outwardly by a cam track $r$ on the drum, said cam track terminating short of the end of the spring catch W. The operation of these parts is as follows: When the crank handle is moved backwardly the crank arm $n'$ passes over the face of the spring catch on the drum until it has passed said catch, the end of which now springs out in front of said arm. Upon the forward movement of the crank handle, the crank arm comes in contact with the catch and thereby causes said drum to turn forwardly. This turning of the drum winds up the cord or cable $q$ and thereby pulls the frame G downwardly, whereby its cutter H enters the butter. This movement continues until the trip arm R, being relieved of the cam track $r$ presses the spring catch W inwardly away from in front of the crank arm $n'$ and the drum being now free can turn backwardly to allow the frame G to rise under the influence of its springs. Upon the side of the frame G are spring catches T, which in the downward movement of the frame pass by and spring out under the extremities of the swinging apron J. Then upon the rise of the frame G, these spring catches tilt backwardly the apron, in the manner heretofore described. In order to provide for the projection of the final strip of butter, it is necessary that the front board $c$ of the frame C shall come up into close contact with the vertical cutters F, and it is further necessary, in order to prevent this final strip of butter from dropping down through the opening in front of the cutters before it reaches them, to provide a full support for said strip. To accomplish these results, I have the last bottom board which I have heretofore referred to as $b'$, and supplemental cross board $b^3$ in the pusher frame.

When the operation has reached the final strip, I remove this supplemental board so that the last board $b'$ can, by contact with the lug $g^3$, be forced backwardly within the pusher frame, to take the place of the removed board, after it has served its purpose as a support for the final strip. Thus said board $b'$ serves, up to the last moment, as a support for the final strip of butter, and instead of being dropped out, as are the previous boards, it is merely forced back into the pusher frame, thereby being removed from under the butter and allowing the final strip to be cut.

Having thus described my invention what I claim as new and desire to secure by Letters Patent is,

1. In a butter molding and cutting machine, the combination of a bottom or bed for supporting the butter, a series of spaced vertical cutters, means for advancing said bottom or bed and feeding the butter to the vertical cutters, whereby it is cut into longitudinally, and a vertically movable horizontal cutter for severing the butter transversely, substantially as described.

2. In a butter molding and cutting machine, the combination of a bottom or bed for supporting the butter, said bottom or bed being composed of detachable separate pieces or slats, a series of spaced vertical cutters, means for advancing the bottom or bed and feeding the butter to the vertical cutters whereby it is cut into longitudinally, means for detaching and dropping each slat of the bottom successively from under the advanced edge of the butter previously to being cut, and a vertically movable horizontal cutter for severing the butter transversely, substantially as described.

3. In a molding and cutting machine, the combination of the slatted bottom for supporting the butter, means for periodically advancing said bottom and butter, a series of spaced vertical cutters to which the butter is fed, whereby it is longitudinally cut into, a vertically movable frame carrying a horizontal cutter for severing the butter transversely, and a lug on said frame for engaging each slat of the bottom, and detaching and dropping each successively, to expose the end of the butter to the action of the vertical cutters, substantially as described.

4. In a butter molding and cutting machine, the combination of a periodically advancing bottom carrying the butter, a series of spaced vertical cutters, means for advancing said cutters to meet and cut into the advancing butter longitudinally, and a vertically movably horizontal cutter to sever the butter transversely, substantially as described.

5. In a butter molding and cutting machine, the combination of a periodically advancing bottom carrying the butter, a sliding carriage and means for advancing it to meet the moving butter, a series of spaced vertical cutters mounted on said carriage for cutting into the butter longitudinally, and a vertically moving frame mounted on said carriage and having a horizontal cutter for severing the butter transversely substantially as described.

6. In a butter molding and cutting machine, the combination of a periodically advancing bottom carrying the butter, said bottom being composed of separate detachable slats, a sliding carriage and means for advancing it to meet the butter, a vertically movable frame on said carriage having a lug engaging the slats of the bottom successively to detach and drop each from under the advanced edge of the butter, a series of spaced vertical cutters for cutting longitudinaly into the advanced and exposed edge of the butter, and a horizontal cutter on the vertically movable frame for severing the butter transversely, substantially as described.

7. In a butter molding and cutting machine the combination of a stand having side rails, closer together at one end than at the other, a series of independent slats mounted upon the rails at the narrow end and forming a supporting bottom for the butter, means for feeding said slats toward the wider end, an advancing carriage with arms to receive and support the advancing slats successively, said carriage having an opening back of its arms to permit the drop of the slats successively, whereby the edge of the butter is exposed, and cutters on said carriage to cut the exposed edge of the butter into squares, substantially as described.

8. In a butter molding and cutting machine, the combination of a periodically advancing bottom for supporting and feeding the butter, a sliding carriage adapted to be moved toward the advancing butter, a series of spaced vertical cutters mounted on said carriage for cutting the advancing edge of the butter longitudinally, a vertically reciprocating frame on the carriage having a horizontal cutter for severing the butter transversely, a tilting apron mounted on the carriage to receive the cut squares and catches on the reciprocating frame for tilting the apron whereby the squares are discharged substantially as described.

9. In a butter molding and cutting machine, the combination of a periodically advancing bottom for supporting and feeding the butter, a carriage and means for moving it to and from the advancing butter, a series of spaced vertical cutters on said carriage to cut into the advancing edge of the butter, a vertically movable frame on the carriage having a horizontal cutter for severing the butter transversely, a tilting apron on said carriage to receive the cut squares, catches on the movable frame to tilt said apron, and fixed stops from under which said apron gradually withdraws, whereby its tilting movement and the return of the movable frame are controlled, substantially as described.

10. In a butter molding and cutting machine the combination of a periodically advancing bottom for supporting and feeding the butter, a carriage and means for moving it to and from the advancing butter, a series of vertical cutters on said carriage to cut into the advancing edge of the butter, a vertically movable frame on the carriage having a horizontal cutter for severing the butter transversely, a receiving board mounted on the carriage, a spring controlled apron hinged to the forward edge of said board and spring catches on the vertically movable frame for tilting the apron, substantially as described.

11. In a butter molding and cutting machine, the combination of the mold bottom for supporting the butter, the pusher frame behind said bottom for advancing it, said frame having the gravity pawl, the slide bars with ratchet teeth with which said pawl engages, and means for operating said bars substantially as described.

12. In a butter molding and cutting machine, the sliding mold bottom and the sliding pusher frame with its front board, in combination with the slide bars having ratchet teeth, the pawl of the pusher frame engaging said teeth, the cross bar of said slide bar, the power shaft with its crank arm and the link connecting said arm with the cross bar, substantially as described.

13. In a butter molding and cutting machine, the combination of the separable boards B of the mold bottom, the last board $b'$ of said bottom, the pusher frame C having the cut away front into which board $b'$ is adapted to withdraw and the removable supplemental board in said cut away portion substantially as described.

14. In a butter molding and cutting machine the combination of the pusher frame having the cut away front, the removable supplemental board therein, the board $b'$ bearing on the front of the removable board and adapted to be forced back into the pusher frame, the separate boards B of the mold bottom, the series of spaced vertical cutters, the vertically movable horizontal cutter and the vertically movable detaching lug for the boards B substantially as described.

15. In a butter molding and cutting machine, the bottom boards of the mold, the pusher frame behind them having the pawl, the sliding ratchet bars engaging said pawl, and the sliding carriage with its cutters, in combination with the means for operating the bottom boards and carriage, consisting of the power shaft having the crank arm, the link connecting one of said arms with the sliding ratchet bars and the slotted link connecting the other of said arms with the carriage substantially as described.

16. In a butter molding and cutting machine the vertically movable frame carrying the horizontal cutter, in combination with the power shaft having the crank arms, the drums loosely mounted on said shaft and having the spring catches and cam tracks, the spring trip arms impinging on said tracks, the cords or cables connecting the drums with the movable frame and the springs for returning said frame substantially as described.

17. In a butter molding and cutting machine the periodically advancing mold bottom and pusher frame, the reciprocating carriage with its series of vertical cutters, and the vertically movable frame with its horizontal cutter, in combination with the power shaft having the crank arms, connections between said crank arms and the pusher frame and carriage respectively, the drums loosely mounted on the shaft, the spring catches and cam tracks on the drums, the spring trip arms, the cords or cables connecting the drums with the vertically movable frame and the springs for returning said frame substantially as described.

In witness whereof I have hereunto set my hand.

PETER OLUF ANDREASEN.

Witnesses:
S. H. NOURSE,
J. A. BAYLESS.